United States Patent
Nohara et al.

(10) Patent No.: US 10,734,684 B2
(45) Date of Patent: Aug. 4, 2020

(54) NONAQUEOUS ELECTROLYTE SOLUTION AND NONAQUEOUS ELECTROLYTE SECONDARY BATTERY

(71) Applicant: ADEKA CORPORATION, Tokyo (JP)

(72) Inventors: Yuta Nohara, Tokyo (JP); Kenji Kakiage, Tokyo (JP); Tomofumi Yokomizo, Tokyo (JP); Hiroaki Watanabe, Tokyo (JP); Yohei Aoyama, Tokyo (JP); Toru Yano, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 140 days.

(21) Appl. No.: 15/749,513

(22) PCT Filed: Sep. 14, 2016

(86) PCT No.: PCT/JP2016/077076
§ 371 (c)(1),
(2) Date: Feb. 1, 2018

(87) PCT Pub. No.: WO2017/047626
PCT Pub. Date: Mar. 23, 2017

(65) Prior Publication Data
US 2018/0226683 A1    Aug. 9, 2018

(30) Foreign Application Priority Data

Sep. 17, 2015    (JP) .................. 2015-183903

(51) Int. Cl.
*H01M 10/0567* (2010.01)
*C07F 7/18* (2006.01)
(Continued)

(52) U.S. Cl.
CPC ....... *H01M 10/0567* (2013.01); *C07F 7/1896* (2013.01); *H01M 4/505* (2013.01);
(Continued)

(58) Field of Classification Search
CPC ......... H01M 10/0567; H01M 2220/30; H01M 10/4235; H01M 10/0525; H01M 4/525;
(Continued)

(56) References Cited

U.S. PATENT DOCUMENTS 5,626,981 A    5/1997    Simon et al.
6,241,596 B1    6/2001    Osterheld et al.
(Continued)

FOREIGN PATENT DOCUMENTS

EP    2775559 A1    9/2014
JP    63-102173    5/1988
(Continued)

OTHER PUBLICATIONS

The website of the National Center for Biotechnology Information, http://pubchem.ncbi.nlm.nih.gov/compound/Tri propan-2-ylsilyl-thiophene-3-carboxylate accessed on Aug. 26, 2019 (Year: 2007).*
(Continued)

*Primary Examiner* — Jonathan G Jelsma
*Assistant Examiner* — Omar M Kekia
(74) *Attorney, Agent, or Firm* — Young & Thompson

(57) ABSTRACT

Disclosed is a nonaqueous secondary battery having a nonaqueous electrolyte containing a lithium salt dissolved in an organic solvent, in which the positive electrode active material is preferably a manganese-containing, lithium transition metal oxide salt. The nonaqueous electrolyte contains at least one compound of general formula (1), preferably at least one compound of general formula (1'). The content of the compound of formula (1) or (1') in the nonaqueous electrolyte is preferably 0.001 to 10 mass %. The symbols in formulae (1) and (1') are as defined in the description.

7 Claims, 2 Drawing Sheets

(51) Int. Cl.
    *H01M 4/505*    (2010.01)
    *H01M 4/525*    (2010.01)
    *H01M 10/0525*  (2010.01)
    *H01M 10/42*    (2006.01)

(52) U.S. Cl.
    CPC ....... *H01M 4/525* (2013.01); *H01M 10/0525* (2013.01); *H01M 10/4235* (2013.01); *H01M 2220/30* (2013.01); *H01M 2300/004* (2013.01); *H01M 2300/0025* (2013.01); *Y02E 60/122* (2013.01); *Y02T 10/7011* (2013.01)

(58) Field of Classification Search
    CPC ... H01M 2300/0025; H01M 2300/004; H01M 4/505; C07F 7/1896; Y02E 60/122; Y02T 10/7011
    USPC .......................................................... 429/188
    See application file for complete search history.

(56) References Cited

U.S. PATENT DOCUMENTS

| | | | |
|---|---|---|---|
| 9,337,511 B2 | 5/2016 | Taki et al. | |
| 2004/0043300 A1 | 3/2004 | Utsugi et al. | |
| 2012/0077076 A1 | 3/2012 | Cheng et al. | |
| 2013/0330607 A1 | 12/2013 | Mizuno et al. | |
| 2015/0044551 A1* | 2/2015 | Taki .................... | H01M 10/052 429/188 |
| 2016/0240888 A1 | 8/2016 | Hamasaki et al. | |

FOREIGN PATENT DOCUMENTS

| | | |
|---|---|---|
| JP | 04-87156 | 3/1992 |
| JP | 05-74486 | 3/1993 |
| JP | 08-501065 | 2/1996 |
| JP | 10-50342 | 2/1998 |
| JP | 2001-266939 A | 9/2001 |
| JP | 2006-294374 A | 10/2006 |
| JP | 2006-351535 | 12/2006 |
| JP | 2007-042439 | 2/2007 |
| JP | 2015-092471 | 5/2015 |
| WO | WO2011-034067 | 3/2011 |

OTHER PUBLICATIONS

International Search Report; PCT/JP2016/077076 dated Nov. 15, 2016.
Extended European Search Report for European Patent Application No. 16846497.2 dated Aug. 12, 2019.
Jereb et al., "Synthesis of trimethylsilyl carboxylates by HMDS under solvent-free conditions," Tetrahedron 72 (2016) 5713-5723.
Kropp et al., "Bacterial Transformations of Benzothiophene and Methylbenzothiophenes," Environ. Sci. Technol. 1994, 28, 1348-1356.
Rotzoll et al., "One-pot synthesis of 3-hydroxymaleic anhydrides by cyclization of 1,1-bis(trimethylsilyloxy)ketene acetals with oxalyl chloride," Tetrahedron 63 (2007) 2647-2656.

* cited by examiner

NONAQUEOUS ELECTROLYTE SOLUTION AND NONAQUEOUS ELECTROLYTE SECONDARY BATTERY

TECHNICAL FIELD

This invention relates to a nonaqueous secondary battery, particularly a nonaqueous secondary battery having a nonaqueous electrolyte containing a specific compound.

BACKGROUND ART

With the recent spread of portable electronic equipment such as notebook computers, video camcorders, and personal digital assistances, nonaqueous electrolyte secondary batteries having high voltage and high energy density have come to be widely used as a power source. From the concern for the environmental protection, electric-powered vehicles and hybrid-powered vehicles utilizing electric power as a part of motive power have already been put to practical use.

Various additives for nonaqueous electrolyte have been proposed to provide nonaqueous secondary batteries with improved stability or electrical characteristics. Examples of such additives include 1,3-propane sultone (see patent document 1 below), vinyl ethylene carbonate (see patent document 2 below), vinylene carbonate (see patent document 3 below), 1,3-propane sultone or butane sultone (see patent document 4 below), vinylene carbonate (see patent document 5 below), and vinyl ethylene carbonate (see patent document 6 below). Among them, vinylene carbonate is widely used for its high effectiveness. These additive compounds are considered to form a stable film called a solid electrolyte interface covering the surface of the negative electrode, which film is expected to prevent reductive decomposition of the electrolyte.

The recent rise in the price of rare metals, such as cobalt and nickel, has rapidly boosted use and development of a positive electrode active material containing a low-cost metal material, such as manganese or iron. A manganese-containing, lithium transition metal oxide salt is one of positive electrode active materials of current interest for its excellent performance, such as capacity and power, in nonaqueous secondary batteries. It is known, however, that manganese is liable to be eluted from a manganese-containing, lithium transition metal oxide salt as a positive electrode active material in a nonaqueous secondary battery particularly during storage in high temperatures or through repeated charge/discharge cycles. The eluted manganese induces a side reaction to cause deterioration of battery performance, such as an increase of internal resistance and reductions of capacity and power.

To prevent elution of manganese from a positive electrode, various additives for a nonaqueous electrolyte have been proposed, including a disulfonic ester as disclosed, e.g., in patent document 7 below. There has still been a demand for further improvements, though.

CITATION LIST

Patent Literature

Patent Literature 1: JP 63-102173A
Patent Literature 2: JP 4-87156A
Patent Literature 3: JP 5-74486A
Patent Literature 4: JP 10-50342A
Patent Literature 5: U.S. Pat. No. 5,626,981
Patent Literature 6: U.S. Pat. No. 6,241,596
Patent Literature 7: US 2004/043300A

SUMMARY OF INVENTION

Technical Problem

An object of the invention is to provide a nonaqueous secondary battery having a nonaqueous electrolyte containing a lithium salt dissolved in an organic solvent, which battery is capable of maintaining low internal resistance and high electrical capacity during storage in high temperatures or through charge/discharge cycles in high temperatures even when in using, as a positive electrode active material, a manganese-containing, lithium transition metal oxide salt as well as a salt of a rare earth metal, such as cobalt or nickel.

Solution to Problem

As a result of extensive investigations, the present inventors have found that the above object is accomplished by using a nonaqueous electrolyte containing a compound having a specific structure and completed the invention based on this finding.

The present invention is to provide a nonaqueous electrolyte comprising an organic solvent and a lithium salt dissolved in the solvent and containing at least one compound represented by general formula (1):

[Chem. 1]

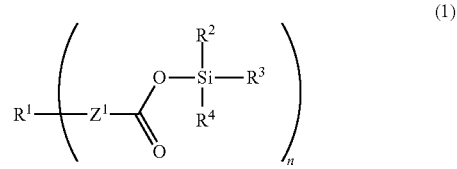

(1)

wherein n represents an integer of 1 to 6; with n being 1 or 3 to 6, $R^1$ represents a group having 1 to 20 carbon atoms and at least one of an oxygen atom and a sulfur atom, or with n being 2, $R^1$ represents —O—, —S—, or a group having 1 to 20 carbon atoms and at least one of an oxygen atom and a sulfur atom;

$R^2$, $R^3$, and $R^4$ each independently represent a saturated aliphatic hydrocarbon group having 1 to 20 carbon atoms or an aromatic hydrocarbon group having 6 to 20 carbon atoms; and $Z^1$ represents a direct bond or an optionally substituted divalent aliphatic hydrocarbon group having 1 to 20 carbon atoms.

The present invention provides the nonaqueos electrolyte and the nonaqueous electrolyte secondary battery.

The present invention is to provide a compound represented by general formula (1'):

[Chem. 1A]

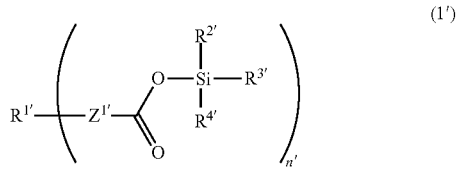

(1')

wherein n' represents an integer of 2 to 6;

$R^1$ represents an optionally substituted thiophene ring or an optionally substituted bicyclic, tricyclic, or tetracyclic fused heterocyclic ring containing at least one thiophene ring;

$R^{2'}$, $R^{3'}$, and $R^{4'}$ each independently represent a saturated aliphatic hydrocarbon group having 1 to 20 carbon atoms or an aromatic hydrocarbon group having 6 to 20 carbon atoms; and $Z^{1'}$ represents a direct bond or an optionally substituted divalent aliphatic hydrocarbon group having 1 to 20 carbon atoms.

DESCRIPTION OF EMBODIMENTS

Figure 1:
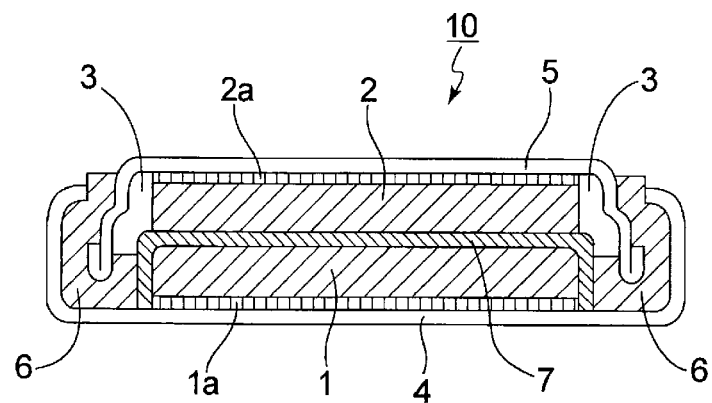
FIG. 1 is a schematic cross-sectional view of an exemplary coin-shaped nonaqueous secondary battery according to an embodiment of the invention.

The nonaqueous electrolyte and nonaqueous secondary battery of the invention will be described in detail with reference to their preferred embodiments.

[I] Nonaqueous Electrolyte

The nonaqueous electrolyte of the invention will be described. The nonaqueous electrolyte of the invention is a solution of a lithium salt in an organic solvent and contains at least one compound represented by general formula (1).

The compound of general formula (1) will be described.

In formula (1), n is an integer of 1 to 6. When n is 1 or 3 to 6, $R^1$ is a group having 1 to 20 carbon atoms and at least one of an oxygen atom and a sulfur atom. When n is 2. $R^1$ is —O—, —S—, or a group having 1 to 20 carbon atoms and at least one of an oxygen atom and a sulfur atom. $R^2$, $R^3$, and $R^4$ each independently represent a saturated aliphatic hydrocarbon group having 1 to 20 carbon atoms or an aromatic hydrocarbon group having 6 to 20 carbon atoms. The C1-C20 group having at least one of oxygen and sulfur atoms as represented by $R^1$ may be any n-valent cyclic or acyclic group. The group $R^1$ preferably has at lest one sulfur atom. When $R^1$ is an acyclic group, the terminal atom of the chain to which $Z^1$ is bonded is preferably an oxygen or sulfur atom. When $R^1$ is a cyclic group, it is preferably an aromatic heterocyclic ring having at least one of oxygen and sulfur atoms. The aromatic heterocyclic ring may be a monocyclic or fused heterocyclic ring. The fused heterocyclic ring is preferably a bicyclic, tricyclic, or tetracyclic ring.

When $R^1$ is acyclic, n in formula (1) is 2 to 6, preferably 2 or 3, more preferably 2. When n=2, $R^1$ is —O—$Z^2$—O— or —S—$Z^{2'}$—S—, in which $Z^2$ is an optionally substituted divalent aliphatic hydrocarbon group having 1 to 5 carbon atoms, and $Z^{2'}$ is a direct bond or an optionally substituted divalent aliphatic hydrocarbon group having 1 to 5 carbon atoms. Examples of the C1-C5 aliphatic hydrocarbon group include methanediyl, 1,1-ethanediyl, 1,2-ethanediyl, 1,1-propanediyl, 1,2-propanediyl, 1,3-propanediyl, 1,2-butanediyl, 1,3-butanediyl, 1,4-butanediyl, 2-methyl-1,2-propanediyl, 2-methyl-1,3-propanediyl, 1,1-pentanediyl, 1,2-pentanediyl, 1,3-pentanediyl, 1,4-pentanediyl, 1,5-pentanediyl, 2,3-pentanediyl, 2,4-pentanediyl, 2-methyl-1,2-butanediyl, 2-methyl-1,3-butanediyl, 2-methyl-1,4-butanediyl, 2-methyl-1,5-butanediyl, 2-methyl-2,3-butanediyl, 2-methyl-2,4-butanediyl, and 2,2-dimethyl-1,3-propanediyl. The C—C bond in these groups may be a double bond or a triple bond. The C1-C5 divalent aliphatic hydrocarbon group may be interrupted at 1 to 3 positions, provided that any two or more of —O—, —C(=O)—, —C(=O)—O—, —O—C(=O)—, —O—C(=O)—O—, —S—, —C(=S)—, and —S—S— may not be next to each other. When the interrupting group contains a carbon atom, the total number of carbon atoms inclusive of that of the interrupting group shall fall within the above range specified for $Z^2$. Examples of the substituent that may substitute the hydrogen atom of the divalent aliphatic group include a halogen atom, a nitro group, a hydroxy group, and a cyano group.

Examples of the group —O—$Z^2$—O— are shown below.

[Chem. 2]

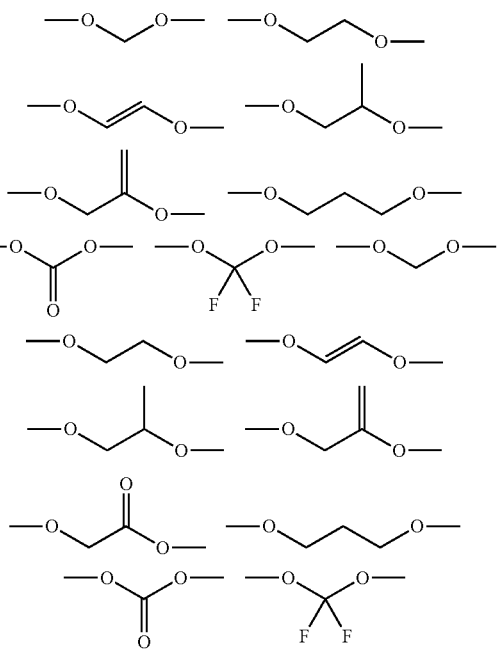

Examples of the group —S—$Z^2$—S— are shown below.

[Chem. 3]

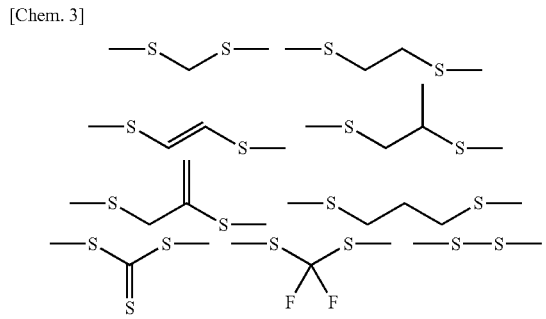

When n=3, $R^1$ is represented by general formula (2) or (3):

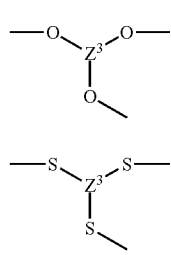

(2)

(3)

wherein $Z^3$ represents an optionally substituted trivalent aliphatic hydrocarbon group having 1 to 5 carbon atoms.

Examples of the C1-C5 trivalent aliphatic hydrocarbon group as represented by $Z^3$ include methanetriyl, 1,1,2-ethanetriyl, 1,2,3-propanetriyl, 1,1,2-propanetriyl, 1,2,3-butanetriyl, 1,2,4-butanetriyl, 1,2,3-pentanetriyl, 1,2,4-pentanetriyl, and 1,2,5-pentanetriyl. The C—C bond in these groups may be a double bond or a triple bond. The C1-C5 trivalent aliphatic hydrocarbon group may be interrupted at 1 to 3 positions, provided that any two or more of —O—, —C(=O)—, —C(=O)—O—, —O—C(=O)—, —S—, —C(=S)—, and —S—S— may not come next to each other. When the interrupting group contains a carbon atom, the total number of carbon atoms inclusive of that of the interrupting group shall fall within the above range specified for $Z^3$. Examples of the substituent that may substitute the hydrogen atom of the trivalent aliphatic group include a halogen atom, a nitro group, a hydroxy group, and a cyano group.

Examples of the group represented by formula (2) are shown below.

[Chem. 5]

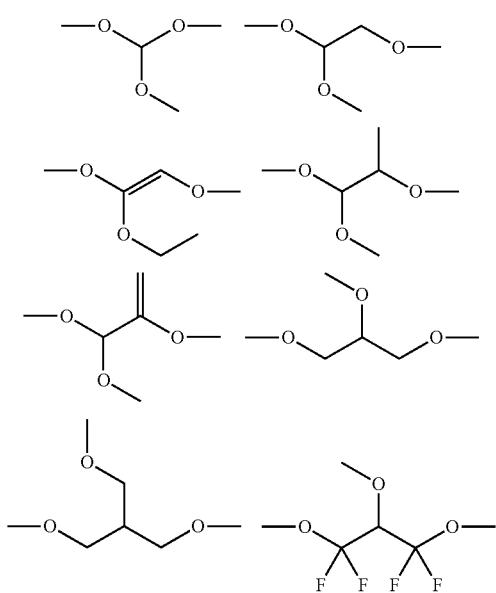

Examples of the group represented by formula (3) are shown below.

[Chem. 6]

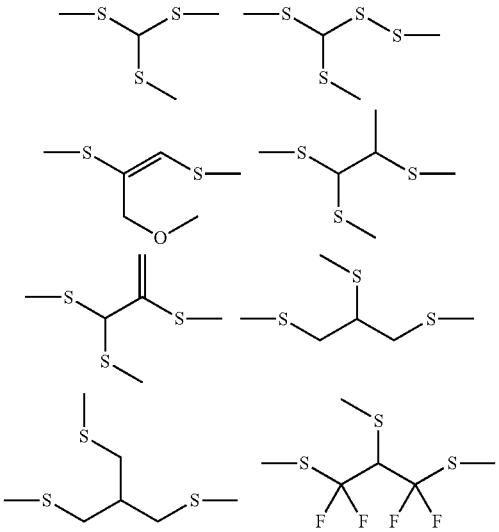

When n=4, $R^1$ is represented by general formula (4) or (5):

[Chem. 7]

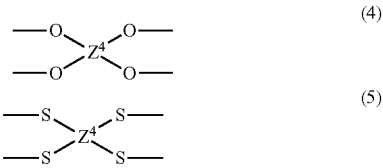

(4)

(5)

wherein $Z^4$ represents an optionally substituted tetravalent aliphatic hydrocarbon group having 1 to 5 carbon atoms.

Examples of the C1-C5 tetravalent aliphatic hydrocarbon group as represented by $Z^4$ include methanetetrayl, 1,1,2,2-ethanetetrayl, 1,1,1,2-ethanetetrayl, 1,1,2,3-propanetetrayl, 1,1,2,3,3-propanetetrayl, 1,1,1,2-propanetetrayl, 1,1,1,3-propanetetrayl, 1,1,2,2-propanetetrayl, 1,2,2,3-propanetetrayl, 1,2,3,4-butanetetrayl, 1,1,2,3-butanetetrayl, 1,1,3,4-butanetetrayl, 1,1,2,2-butanetetrayl, 1,1,3,3-butanetetrayl, 1,1,4,4-butanetetrayl, 1,1,1,2-butanetetrayl, butanetetrayl, 1,1,1,4-butanetetrayl, 1,2,2,3-butanetetrayl, 1,2,2,4-butanetetrayl, 1,2,3,4-pentanetetrayl, 1,2,3,5-pentanetetrayl, and 1,2,4,5-pentanetetrayl. The C—C bond in these groups may be a double bond or a triple bond. The C1-C5 tetravalent aliphatic hydrocarbon group may be interrupted at 1 to 3 positions, provided that any two or more of —O—, —C(=O)—, —C(=O)—O—, —O—C(=O)—, —O—C(=O)—O, —S—, —C(=S)—, and —S—S— may not come next to each other. When the interrupting group contains a carbon atom, the total number of carbon atoms inclusive of that of the interrupting group shall fall within the above range specified for $Z^4$. Examples of the substituent that may substitute the hydrogen atom of the tetravalent aliphatic group include a halogen atom, a nitro group, a hydroxy group, and a cyano group.

Examples of the group represented by formula (4) are shown below.

[Chem. 8]

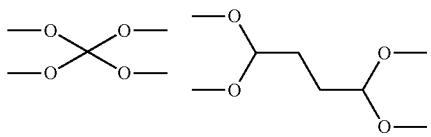

Examples of the group represented by formula (5) are shown below.

[Chem. 9]

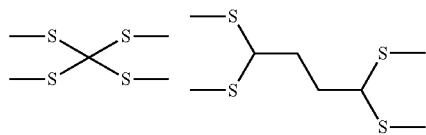

When $R^1$ is a cyclic group, the ring is heterocyclic. Examples of the heterocyclic ring are shown below. Preferred of them are those having at least one of a furan ring and a thiophene ring, with those having at least one thiophene ring being more preferred.

[Chem. 10]

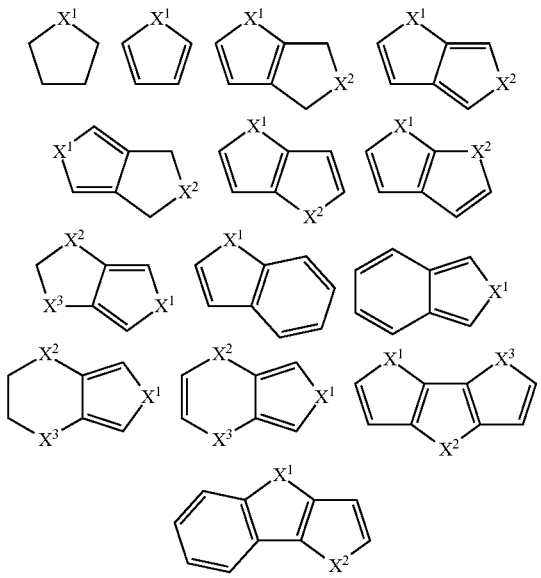

wherein $X^2$, and $X^3$ each independently represent an oxygen atom or a sulfur atom.

The heterocyclic ring may have its hydrogen atom substituted by a halogen atom, a nitro group, a cyano group, a C1-C6 hydrocarbon group, a C1-C6 hydrocarbon oxy group, or a C1-C6 hydrocarbon thio group. Examples of the C1-C6 hydrocarbon group include methyl, ethyl, propyl, isopropyl, butyl, t-butyl, pentyl, hexyl, cyclohexyl, and phenyl. Examples of the C1-C6 hydrocarbon oxy group include the above listed hydrocarbon groups of which the bond to the heterocyclic ring is interrupted by an oxygen atom. Examples of the C1-C6 hydrocarbon thio group include the above listed hydrocarbon groups of which the bond to the heterocyclic ring is interrupted by a sulfur atom.

Examples of the C1-C20 hydrocarbon group as represented by $R^2$, $R^3$, and $R^4$ include a C1-C20 saturated or unsaturated aliphatic hydrocarbon group and a C6-C20 aromatic hydrocarbon group. Examples of the C1-C20 saturated or unsaturated hydrocarbon group include methyl, ethyl, propyl, 2-propynyl, butyl, isobutyl, s-butyl, t-butyl, pentyl, isopentyl, hexyl, decyl, dodecyl, octadecyl, vinyl, ethynyl, allyl, propargyl, 3-butenyl, isobutenyl, 3-butynyl, 4-pentenyl, and 5-hexenyl. Examples of the C6-C20 aromatic hydrocarbon group include phenyl, naphthyl, cyclohexylphenyl, biphenyl, fluorenyl, T-phenyl-propylphenyl, benzyl, and naphthylmethyl.

When n in formula (1) is greater than 1, while the plurality of each of $R^2$, $R^3$, and $R^4$ may be the same or different, it is preferred that the plurality of each of $R^2$, $R^3$, and $R^4$ be the same in terms of ease of preparation of the compound.

Examples of the C1-C20 divalent aliphatic hydrocarbon group as $Z^1$ include methanediyl, 1,1-ethanediyl, 1,2-ethanediyl, 1,1-propanediyl, 1,2-propanediyl, 1,3-propanediyl, 1,2-butanediyl, 1,3-butanediyl, 1,4-butanediyl, 2-methyl-1,2-propanediyl, 2-methyl-1,3-propanediyl, 1,1-pentanediyl, 1,2-pentanediyl, 1,3-pentanediyl, 1,4-pentanediyl, 1,5-pentanediyl, 2,3-pentanediyl, 2,4-pentanediyl, 2-methyl-1,2-butanediyl, 2-methyl-1,3-butanediyl, 2-methyl-1,4-butanediyl, 2-methyl-1,5-butanediyl, 2-methyl-2,3-butanediyl, 2-methyl-2,4-butanediyl, 2,2-dimethyl-1,3-propanediyl, hexanediyl, heptanediyl, octanediyl, nonanediyl, and decanediyl. The C—C bond in these groups may be a double bond or a triple bond. The C1-C20 divalent aliphatic hydrocarbon group may be interrupted at 1 to 3 positions, provided that any two or more of —O—, —C(=O)—, —C(=O)—O—, —O—C(=O)—, —O—C(=O)—O—, —S—, —C(=S)—, and —S—S— may not come next to each other. Examples of the substituent that may substitute the hydrogen atom of the divalent aliphatic group include a halogen atom, a nitro group, a hydroxy group, a cyano group, and a group having general formula (6):

[Chem. 11]

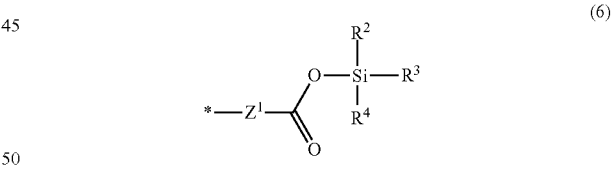

(6)

wherein $R^2$, $R^3$, $R^4$, and $Z^1$ are as defined above; and the asterisk indicates the position of substitution.

When the interrupting group contains a carbon atom, the total number of carbon atoms inclusive of that of the interrupting group shall fall within the above range specified for $Z^1$.

In formula (1), n is an integer of 1 to 6. While the effects of the invention are displayed as long as n is within that range, n is preferably 1 to 4. Compounds in which n is greater than 6 have increased boiling points and are difficult to purify.

Specific examples of the compounds of formula (1) in which n is 1 include the following compounds numbered 1-1 through 1-16.

[Chem. 12]
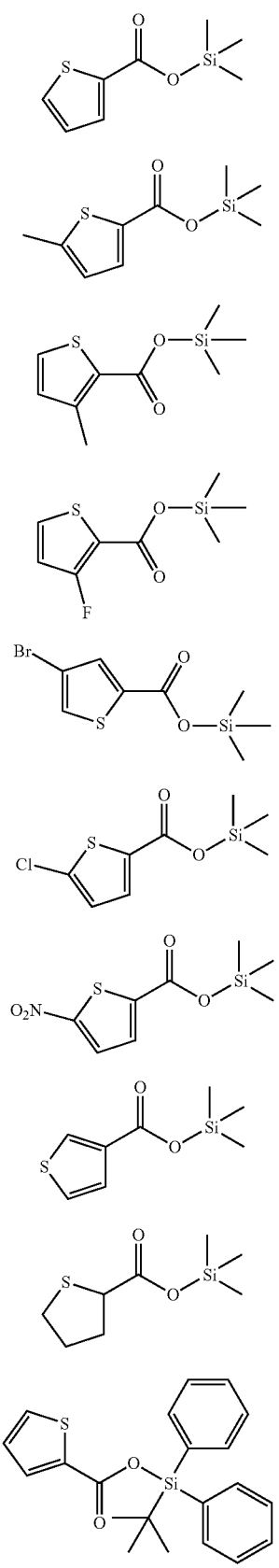
No. 1-1
No. 1-2
No. 1-3
No. 1-4
No. 1-5
No. 1-6
No. 1-7
No. 1-8
No. 1-9
No. 1-10
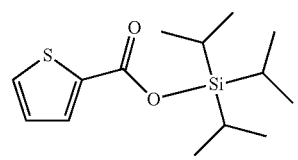
No. 1-11
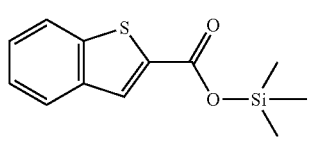
No. 1-12
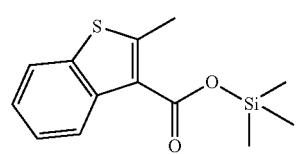
No. 1-13
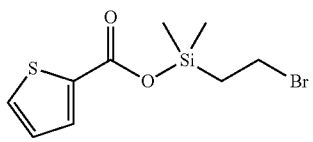
No. 1-14
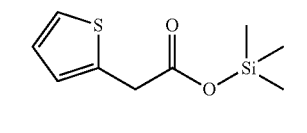
No. 1-15
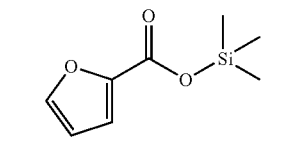
No. 1-16
Specific examples of the compounds of formula (1) in which n is 2 include the following compounds numbered 2-1 through 2-31.
[Chem. 13]
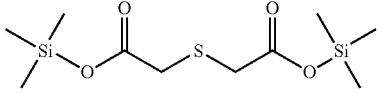
No.2-1
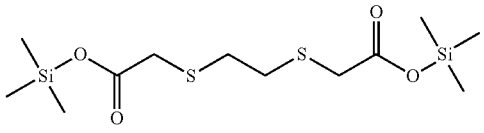
No.2-2
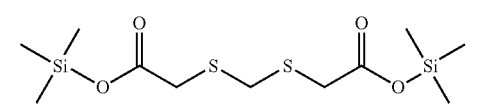
No.2-3
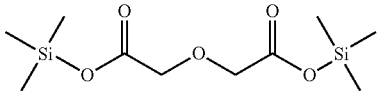
No.2-4

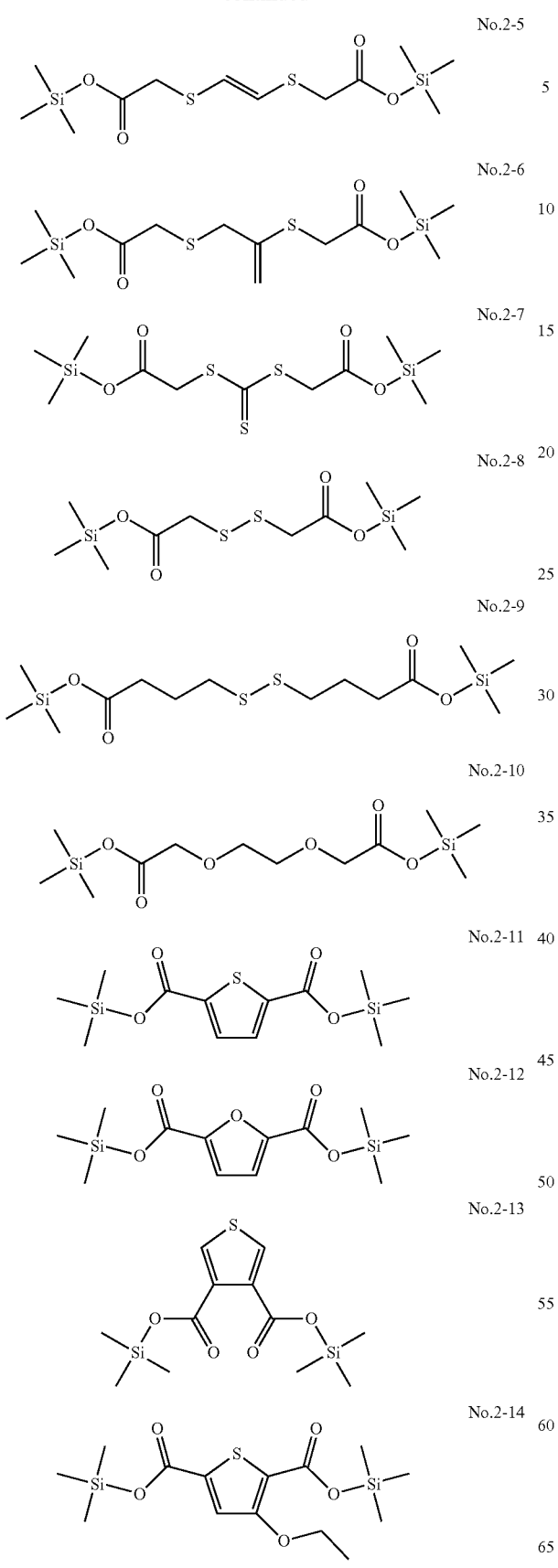
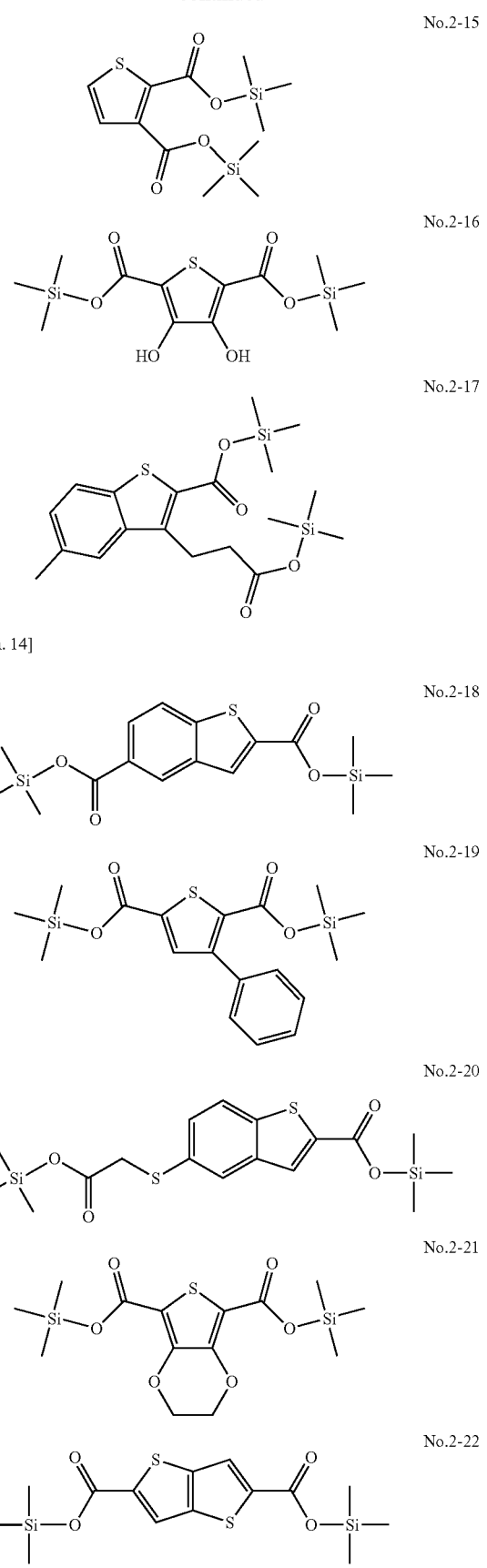

-continued

No.2-23
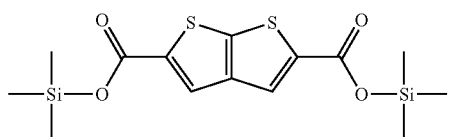

No.2-24
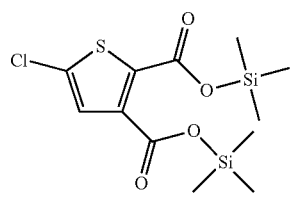

No.2-25
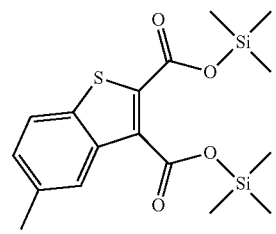

No.2-26
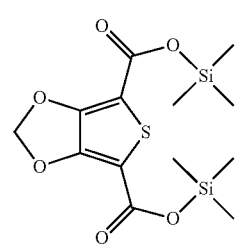

No.2-27
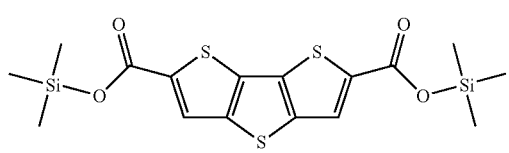

No.2-28
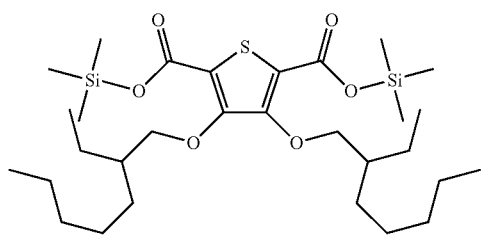

No.2-29
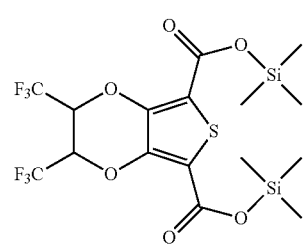

No.2-30
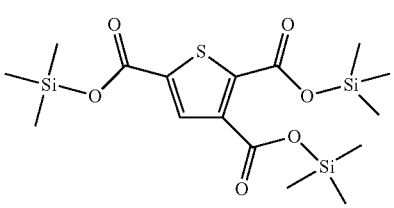

No.2-31
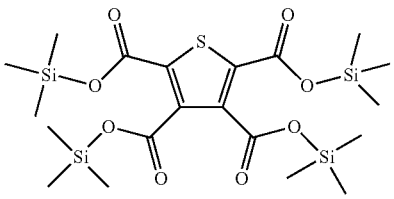

Specific examples of the compounds of formula (1) in which n is 3 include the following compound numbered 3-1.

[Chem. 13]

No. 3-1

Specific examples of the compounds of formula (1) in which n is 4 include the following compound numbered 4-1.

[Chem. 16]

No. 4-1

In the compounds of formula (1), $R^2$, $R^3$, and $R^4$ are each preferably a C1-C10 saturated aliphatic hydrocarbon group or a phenyl group, more preferably a C1-C5 saturated aliphatic hydrocarbon group or a phenyl group, and $Z^1$ is preferably a direct bond or a C1-C10 divalent aliphatic hydrocarbon group, more preferably a direct bond or a C1-C5 divalent aliphatic hydrocarbon group.

The nonaqueous electrolyte of the invention may contain one or more of the compounds of formula (1).

The content of the compound of formula (1) in the nonaqueous electrolyte is preferably 0.001 to 10 mass %, more preferably 0.01 to 8 mass %, even more preferably 0.1 to 5 mass %. If the content is too small, the compound will fail to produce sufficient effects. Addition of too much of the compound brings about no further enhancement of the effects commensurate with the increased amount of addition or can adversely affect the characteristics of the nonaqueous electrolyte.

It is preferred to further add to the nonaqueous electrolyte of the invention a fluorosilane compound, a cyclic carbonate compound having an unsaturated group, an acyclic carbonate compound, an unsaturated diester compound other than the compound of formula (1) (especially an unsaturated biscarboxylic acid alkoxysilyl ester), a cyclic sulfate ester, a cyclic sulfite ester, sultone, or a halogenated cyclic carbonate compound.

Examples of the fluorosilane compound include bis(fluorodimethylsilyl)methane, bis(difluoromethylsilyl)methane, 1,2-bis(fluorodimethylsilyl)ethane, 1,2-bis-(difluoromethylsilyl)ethane, 1,3-bis(fluorodimethylsilyl)propane, 1,3-bis(difluoromethylsilyl)propane, 1,4-bis(fluorodimethylsilyl)butane, 1,4-bis(difluoromethylsilyl)butane, 1,4-bis(fluorodimethylsilyl)benzene, 1,4-bis(difluoromethylsilyl)benzene, tris(fluorodimethylsilyl)methane, tris(difluoromethylsilyl)methane, tetrakis(fluorodimethylsilyl)methane, and tetrakis(difluoromethylsilyl)methane. Preferred of them are 1,2-bis(difluoromethylsilyl)ethane, 1,3-bis(difluoromethylsilyl)propane, 1,4-bis(difluoromethylsilyl)butane, and tris(difluoromethylsilyi)methane.

Examples of the cyclic carbonate compound having an unsaturated group include vinylene carbonate, vinyl ethylene carbonate, propylidene carbonate, ethylene ethylidene carbonate, and ethylene isopropylidene carbonate. Preferred of them are vinylene carbonate and vinyl ethylene carbonate.

Examples of the acyclic carbonate compound include dipropargyl carbonate, propargyl methyl carbonate, ethyl propargyl carbonate, bis(1-methylpropargyl) carbonate, and bis(1-dimethylpropargyl) carbonate.

Examples of the unsaturated diester compound include dimethyl maleate, diethyl maleate, dipropyl maleate, dibutyl maleate, dipentyl maleate, dihexyl maleate, diheptyl maleate, dioctyl maleate, dimethyl fumarate, diethyl fumarate, dipropyl fumarate, dibutyl fumarate, dipentyl fumarate, dihexyl fumarate, diheptyl fumarate, dioctyl fumarate, dimethyl acetylenedicarboxylate, diethyl acetylenedicarboxylate, dipropyl acetylenedicarboxylate, dibutyl acetylenedicarboxylate, dipentyl acetylenedicarboxylate, dihexyl acetylenedicarboxylate, diheptyl acetylenedicarboxylate, dioctyl acetylenedicarboxylate, bis(trimethylsilyl) acetylenedicarboxylate, bis(ethyldimethylsilyl) acetylenedicarboxylate, bis(dimethylpropylsilyl) acetylenedicarboxylate, bis(dimethylbutylsilyl) acetylenedicarboxylate, bis(dimethylvinylsilyl) acetylenedicarboxylate, bis(trimethylsilyl) fumarate, bis(trimethylsilyl) maleate, bis(trimethylsilyl) phthalate, bis(trimethylsilyl) isophthalate, bis(trimethylsilyl) terephthalate, bis(trimethylsilyl) malonate, bis(trimethylsilyl) succinate, bis(trimethylsilyl) glutarate, and bis(trimethylsilyl) adipate.

Examples of the cyclic sulfate ester include 1,3,2-dioxathiolane-2,2-dioxide, 1,3-propanediol cyclic sulfate, and propane 1,2-cyclic sulfate.

Examples of the cyclic sulfite ester include ethylene sulfite and propylene sulfite. Examples of the sultone include propane sultone, butane sultone, and 1,5,2,4-dioxadithiolane-2,2,4,4-tetroxide. Examples of the halogenated cyclic carbonate compound include chloroethylene carbonate, dichloroethylene carbonate, fluoroethylenecarbonate, and difluoroethylene carbonate.

Preferred of these additives are 1,2-bis(difluoromethylsilyl)ethane, 1,4-bis(difluoromethylsilyl)butane, tris(difluoromethylsilyl)methane, vinylene carbonate, vinyl ethylene carbonate, dipropargyl carbonate, dimethyl acetylenedicarboxylate, diethyl acetylenedicarboxylate, bis(trimethylsilyl) acetylenedicarboxylate, bis(trimethylsilyl) fumarate, bis(trimethylsilyl)maleate, propane sultone, butane sultone, chloroethylene carbonate, dichloroethylene carbonate, and fluoroethylene carbonate. More preferred are 1,2-bis(difluoromethylsilyl)ethane, 1,4-bis(difluoromethylsilyl)butane, tris(difluoromethylsilyl)methane, vinylene carbonate, dipropargyl carbonate, dimethyl acetylenedicarboxylate, bis(trimethylsilyl) fumarate, bis(trimethylsilyl) maleate, propane sultone, and fluoroethylene carbonate. Even more preferred are 1,2-bis(difluoromethylsilyl)ethane, 1,4-bis(difluoromethylsilyl)butane, tris(difluoromethylsilyl)methane, vinylene carbonate, bis(trimethylsilyl) fumarate, bis(trimethylsilyl) maleate, and fluoroethylene carbonate.

These additives may be used either individually or in combination. If the content of the additive in the nonaqueous electrolyte of the invention is too small, the additive compound may fail to produce sufficient effects. If, to the contrary, the content is too large, not only may effects reflecting the increased content not be obtained but the characteristics of the nonaqueous electrolyte may be adversely affected. Accordingly, the total content of these additives is preferably 0.005 to 10 mass %, more preferably 0.02 to 5 mass %, even more preferably 0.05 to 3 mass relative to the nonaqueous electrolyte.

The organic solvent that can be used in the nonaqueous electrolyte according to the invention may be one of or a combination of two or more of organic solvents commonly used in nonaqueous electrolytes. Examples of useful organic solvents include saturated cyclic carbonate compounds, saturated cyclic ester compounds, sulfoxide compounds, sulfone compounds, amide compounds, saturated acyclic carbonate compounds, acyclic ether compounds, cyclic ether compounds, and saturated acyclic ester compounds.

Inter alia, saturated cyclic carbonate compounds, saturated cyclic ester compounds, sulfoxide compounds, sulfone compounds, and amide compounds have a high relative permittivity and therefore play a role to increase the dielectric constant of the nonaqueous electrolyte. Saturated cyclic carbonate compounds are particularly preferred. Examples of the saturated cyclic carbonate compounds include ethylene carbonate, 1-fluoroethylene carbonate, 1,2-propylene carbonate, 1,3-propylene carbonate, 1,2-butylene carbonate, 1,3-butylene carbonate, and 1,1-dimethylethylene carbonate.

Examples of the saturated cyclic ester compounds include γ-butyrolactone, γ-valerolactone, γ-caprolactone, δ-hexanolacotne, and δ-octanolactone.

Examples of the sulfoxide compounds include dimethyl sulfoxide, diethyl sulfoxide, dipropyl sulfoxide, diphenyl sulfoxide, and thiophene.

Examples of the sulfone compounds include dimethyl sulfone, diethyl sulfone, dipropyl sulfone, diphenyl sulfone, sulfolane (also called tetramethylene sulfone), 3-methylsulfolane, 3,4-dimethylsulfolane, 3,4-diphenylmethylsulfolane, sulfolene, 3-methylsulfolene, 3-ethylsulfolene, and 3-bromomethylsulfolene, with sulfolane and tetramethyl sulfolane being preferred.

Examples of the amide compounds are N-methylpyrrolidone, dimethylformamide, and dimethylacetamide.

Of the above described organic solvents saturated acyclic carbonate compounds, acyclic ether compounds, cyclic ether compounds, and saturated acyclic ester compounds decrease the viscosity of the nonaqueous electrolyte and increase mobility of electrolyte ions thereby to improve battery characteristics, such as power density. To have a low viscosity brings about improvement on the low temperature performance of the nonaqueous electrolyte. Inter cilia, saturated acyclic carbonate compounds are preferred. Examples of suitable saturated acyclic carbonate compounds include dimethyl carbonate, ethylmethyl carbonate, diethyl carbonate, ethylbutyl carbonate, methyl-t-butyl carbonate, diisopropyl carbonate, and t-butylpropyl carbonate.

Examples of the acyclic or cyclic ether compounds include dimethoxyethane, ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl) ether, propylene glycol bis(trifluoroethyl) ether, ethylene glycol bis(trifluoromethyl) ether, and diethylene glycol bis(trifluoroethyl) ether, with dioxolane being preferred.

The saturated acyclic ester compounds are preferably mono- or diester compounds having a total of 2 to 8 carbon atoms per molecule, such as methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethylacetate, ethyl trimethylacetate, methyl malonate, ethyl malonate, methyl succinate, ethyl succinate, methyl 3-methoxypropionate, ethyl 3-methoxypropionate, ethylene glycol diacetyl, and propylene glycol diacetyl. Preferred of them are methyl formate, ethyl formate, methyl acetate, ethyl acetate, propyl acetate, isobutyl acetate, butyl acetate, methyl propionate, and ethyl propionate.

In addition to this, acetonitrile, propionitrile, nitromethane, and their derivatives are also usable as an organic solvent.

Conventionally known lithium salts can be used in the nonaqueous electrolyte of the invention. Examples include $LiPF_6$, $LiBF_4$, $LiAsF_6$, $LiCF_3SO_3$, $LiCF_3CO_2$, $LiN(CF_3SO_2)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiAlF_4$, $LiSCN$, $LiClO_4$, $LiCl$, $LiF$, $LiBr$, $LiI$, $LiAlF_4$, $LiAlCl_4$, and their derivatives. It is preferred to use at least one member selected from the group consisting of $LiPF_6$, $LiBF_4$, $LiClO_4$, $LiAsF_6$, $LiCF_3SO_3$, $LiC(CF_3SO_2)_3$, $LiCF_3SO_3$ derivatives, and $LiC(CF_3SO_2)_3$ derivatives in terms of good electrical characteristics.

The lithium salt is preferably dissolved in the organic solvent in a concentration of 0.1 to 3.0 mol/l, more preferably 0.5 to 2.0 mol/l. At lithium salt concentrations lower than 0.1 mol/l, the resulting battery may fail to provide a sufficient current density. Lithium salt concentrations higher than 3.0 mol/l can impair the stability of the nonaqueous electrolyte. The lithium salts described may be used in combination of two or more thereof.

The nonaqueous electrolyte of the invention may further contain an overcharge protection agent. Examples of useful overcharge protection agents include aromatic compounds, such as biphenyl, alkylbiphenyls, terphenyl, partially hydrogenated terphenyl, cyclohexylbenzene, t-butylbenzene, t-amylbenzene, diphenyl ether, and dibenzofuran; partial fluorination products of the above aromatic compounds, such as 2-fluorobiphenyl, o-cyclohexylfluorobenzene, and p-cyclohexylfluorobenzene; and fluorine-containing anisole compounds, such as 2,4-difluoroanisole, 2,5-difluoroanisole, 2,6-difluoroanisole, and 3,5-difluoroanisole. Preferred of them are aromatic compounds, such as biphenyl, alkylbiphenyls, terphenyl, partially hydrogenated terphenyl, cyclohexylbenzene, t-butylbenzene, t-amylbenzene, diphenyl ether, and dibenzofuran.

The following compounds numbered 1 through 25 are also preferably used.

[Chem. 17]

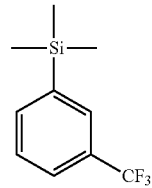

1

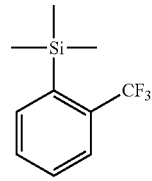

2

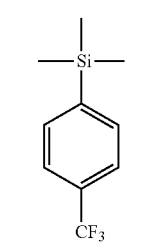

3

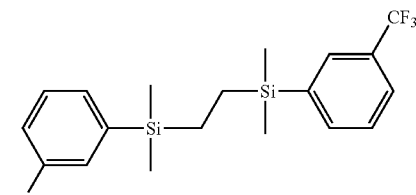

4

[Chem. 18]

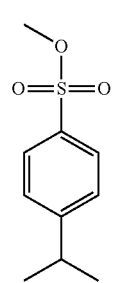

5

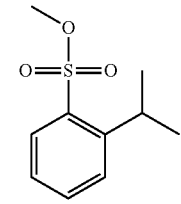

6

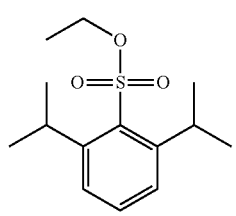

7

8
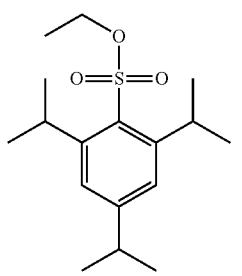
9
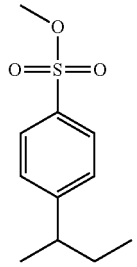
10
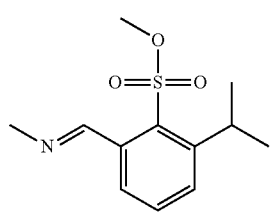
11
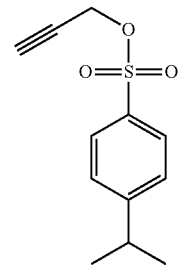
12
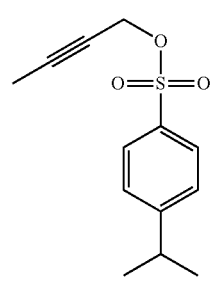
13
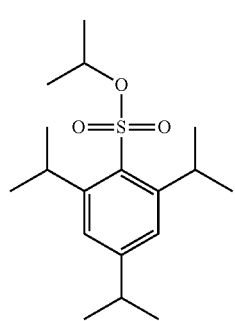
14
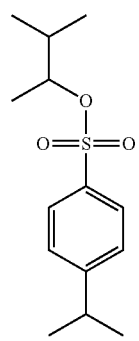
15
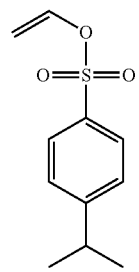
16
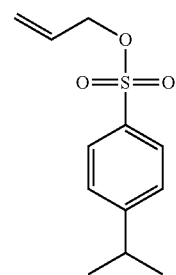
17
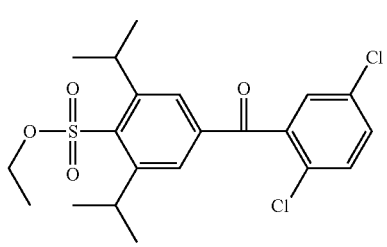
18
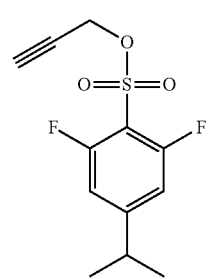

[Chem. 18A]

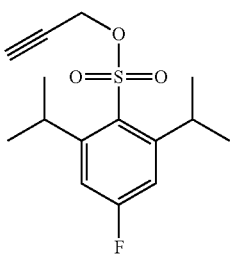

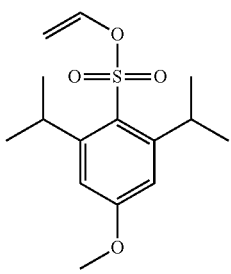

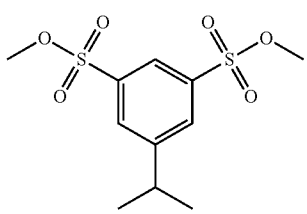

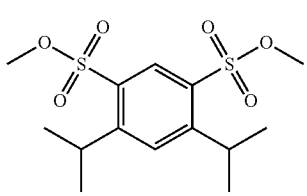

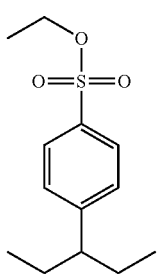

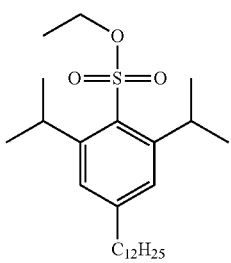

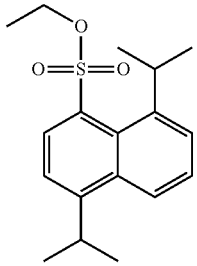

The content of the overcharge protection agent, if used, in the nonaqueous electrolyte is not particularly limited and is preferably 0.001 to 10 mass %, more preferably 0.01 to 8 mass %, even more preferably 0.1 to 5 mass %.

A flame retardant of halogen, phosphorus or other types may be added to the nonaqueous electrolyte of the invention as appropriate to provide a flame retardant electrolyte. Addition of too small an amount of a flame retardant fails to produce sufficient flame retardation effects. If, to the contrary, the amount of a flame retardant is too large, not only may effects reflecting the increased content not be obtained but the characteristics of the nonaqueous electrolyte may be adversely affected. Accordingly, the amount of a flame retardant to be added is preferably 1 to 50 mass %, more preferably 3 to 10 mass %, relative to the organic solvent of the nonaqueous electrode.

Although the nonaqueous electrolyte of the invention is useful in both primary batteries and secondary batteries, the above discussed effects of the nonaqueous electrolyte of the invention are manifested when it is used in nonaqueous secondary batteries as is claimed in the present invention, particularly a lithium ion secondary battery.

[II] Nonaqueous Secondary Battery

The nonaqueous secondary battery of the invention has the nonaqueous electrolyte of the invention and is preferably a nonaqueous secondary battery having a negative electrode capable of intercalating and deintercalating lithium, a positive electrode containing a transition metal and lithium, and a nonaqueous electrolyte having a lithium salt dissolved in an organic solvent, wherein the nonaqueous electrolyte is the nonaqueous electrolyte of the invention.

[III] Negative Electrode

Any negative electrode capable of intercalating and deintercalating lithium can be used in the invention. A preferred negative electrode is as follows. The negative electrode of the nonaqueous secondary battery according to the invention is made by dispersing a negative electrode active material and a binder in an organic solvent or water and applying the resulting slurry to a current collector, followed by drying into a sheet form. If desired, an electroconductive material is incorporated therein.

Examples of the negative electrode active material include, but are not limited to, natural graphite, synthetic graphite, non-graphitizing carbon, graphitizing carbon, lithium, lithium alloys, tin alloys, silicon alloys, silicon oxide, and titanium oxide. Preferred of them are those containing carbon, i.e., natural graphite, synthetic graphite, non-graphitizing carbon, and graphitizing carbon, with a view to enhancing the effects of the invention, i.e., overcharge protection and retention of small internal resistance and high electrical capacity even after charge/discharge cycles. The negative electrode may contain a mixture of the above enumerated active materials, in which case the mixture preferably contains a carbon-containing active material.

Examples of the binder used in the negative electrode include, but are not limited to, polyvinylidene fluoride, polytetrafluoroethylene, EPDM, SBR, NBR, fluororubber, and polyacrylic acid. The binder is preferably used in an amount of 0.001 to 5 parts by mass, more preferably 0.05 to 3 parts by mass, even more preferably 0.01 to 2 parts by mass, per 100 parts by mass of the negative electrode active material.

Examples of the solvent for preparing the slurry include, but are not limited to, N-methylpyrrolidone, dimethylformamide, dimethylacetamide, methyl ethyl ketone, cyclohexanone, methyl acetate, methyl acrylate, diethyltriamine, N,N-dimethylaminopropylamine, polyethylene oxide, and tetrahydrofuran. The solvent is preferably used in an amount of 30 to 300 parts, more preferably 50 to 200 parts, by mass per 100 parts by mass of the negative electrode active material.

The current collector of the negative electrode is usually made of copper, nickel, stainless steel, or nickel-plated copper.

Examples of the electroconductive material that may be used where needed include, but are not limited to, particles of graphene, graphite, or amorphous carbon such as carbon black (e.g., acetylene black or ketjen black) and needle coke, and carbon nanofiber.

[IV] Positive Electrode

The positive electrode containing a transition metal and lithium that can be used in the invention is prepared in the same manner as for the negative electrode. That is, a slurry of a positive electrode active material, a binder, an electroconductive material, etc. in an organic solvent or water is applied to a current collector and dried into a sheet form.

The positive electrode active material contains a transition metal and lithium. Preferred is a substance containing one transition metal and lithium, such as a lithium-transition metal complex oxide or a lithium-containing transition metal phosphate compound. A mixture of such substances may be used. The transition metal of the lithium-transition metal complex oxide is preferably vanadium, titanium, chromium, manganese, iron, cobalt, nickel, or copper. Examples of the lithium-transition metal complex oxide include a lithium-cobalt complex oxide (e.g., $LiCoO_2$), a lithium-nickel complex oxide (e.g., $LiNiO_2$), a lithium-manganese complex oxide (e.g., $LiMnO_2$, $LiMn_2O_4$, or $Li_2MnO_3$), each of which may have part of its transition metal atom substituted with other metal element, e.g., aluminum, titanium, vanadium, chromium, manganese, iron, cobalt, lithium, nickel, copper, zinc, magnesium, gallium, or zirconium. Examples of such substituted complex oxides include $Li_{1.1}Mn_{1.8}Mg_{0.1}O_4$, $Li_{1.1}Mn_{1.85}Al_{0.05}O_4$, $LiNi_{0.5}Co_{0.2}Mn_{0.3}O_2$, $LiNi_{0.5}Mn_{0.5}O_2$, $LiNi_{0.80}Co_{0.17}Al_{0.03}O_2$, $LiNi_{1/3}Co_{1/3}Mn_{1/3}O_2$, $LiMn_{1.8}Al_{0.2}O_4$, and $LiMn_{1.5}Ni_{0.5}O_4$. The transition metal of the lithium-containing transition metal phosphate compound is preferably vanadium, titanium, manganese, iron, cobalt, or nickel. Examples of the lithium-containing transition metal phosphate compound include iron phosphates (e.g., $LiFePO_4$) and cobalt phosphates (e.g., $LiCoPO_4$), each of which may have part of its transition metal substituted with other metal element, e.g., aluminum, titanium, vanadium, chromium, manganese, iron, cobalt, lithium, nickel, copper, zinc, magnesium, gallium, zirconium, or niobium. Preferred of them is the lithium-transition metal complex oxide containing magnesium with a view to enhancing the effects of the invention, i.e., overcharge protection and retention of low internal resistance and high electrical capacity even after charge/discharge cycles. In particular, $LiMn_2O_4$, $Li_{1.1}Mn_{1.8}Mg_{0.1}O_4$, $Li_{1.1}Mn_{1.85}Al_{0.05}O_4$, $LiNi_{1/3}Co_{1/3}O_2$, and $LiNi_{0.5}Co_{0.2}Mn_{0.3}O_2$ are preferred probably because the compound of formula (1) in the nonaqueous electrolyte of the invention is able to prevent elution of manganese from the positive electrode.

The binder and the solvent used to prepare the slurry for making the positive electrode are the same as those useful to make the negative electrode. The binder is preferably used in an amount of 0.001 to 20 parts, more preferably 0.01 to 10 parts, even more preferably 0.02 to 8 parts, by mass per 100 parts by mass of the positive electrode active material. The solvent is preferably used in an amount of 30 to 300 parts, more preferably 50 to 200 parts, by mass per 100 parts by mass of the positive electrode active material.

Examples of the electroconductive material that may be used in the positive electrode include, but are not limited to, particles of graphite, and amorphous carbon such as carbon black (e.g., acetylene black or ketjen black) and needle coke, and carbon nanofiber. The amount of the electroconductive material to be used is preferably 0.01 to 20 parts, more preferably 0.1 to 10 parts, by mass per 100 parts by mass of the positive electrode active material.

The current collector of the positive electrode is usually made of aluminum, stainless steel, or nickel-plated steel.

It is preferable to interpose a separator between the positive and the negative electrode in the nonaqueous electrolyte secondary battery according to the invention. A commonly employed microporous polymer film can be used as a separator with no particular restriction. Polymer materials providing a microporous film separator include polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyethers such as polyethylene oxide and polypropylene oxide, celluloses such as carboxymethyl cellulose and hydroxypropyl cellulose, poly(meth)acrylic acid and esters thereof; derivatives of these polymers; copolymers of monomers of the recited polymers; and polyblends of these polymer materials. The separator may be a single film or a composite film composed of two or more films. Various additives may be added to the separator film with no particular limitation on the kind and amount. A film made of polyethylene, polypropylene, polyvinylidene fluoride, or polysulfone is particularly preferred for use in the nonaqueous secondary battery of the invention.

The separator film is microporous for allowing the electrolyte ions to penetrate therethrough. Such a microporous film is prepared by (1) a phase separation method comprising inducing microphase separation in a solution of a polymer in a solvent in film form and removing the solvent by extraction and (2) a stretching method comprising extruding a molten polymer at a high draft ratio, heat treating the extruded film to unidirectionally align the crystals, and stretching the film to form voids between crystals. The method of microporous film formation is chosen according to the film material.

In order to ensure safety of the nonaqueous secondary battery of the invention, a phenol antioxidant, a phosphorus antioxidant, a thioether antioxidant, a hindered amine compound, or a like stabilizer may be added to the positive electrode materials, the nonaqueous electrolyte, or the separator.

The nonaqueous secondary battery of the invention is not particularly limited in shape and may be coin-shaped, cylindrical, or prismatic. FIG. 1 illustrates an example of a coin-shaped nonaqueous secondary battery of the invention, and FIGS. 2 and 3 each illustrate an example of a cylindrical nonaqueous secondary battery of the invention.

The coin battery 10 illustrated in FIG. 1 has a positive electrode 1 capable of deintercalating lithium ions, a positive electrode current collector 1a, a negative electrode 2 made of a carbonaceous material capable of intercalating/deintercalating lithium ions released from the positive electrode, a negative electrode current collector 2a, a nonaqueous electrolyte 3 of the invention, a positive electrode case 4 made of stainless steel, a negative electrode case 5 made of stainless steel, a polypropylene gasket 6, and a polyethylene separator 7.

Figure 2:
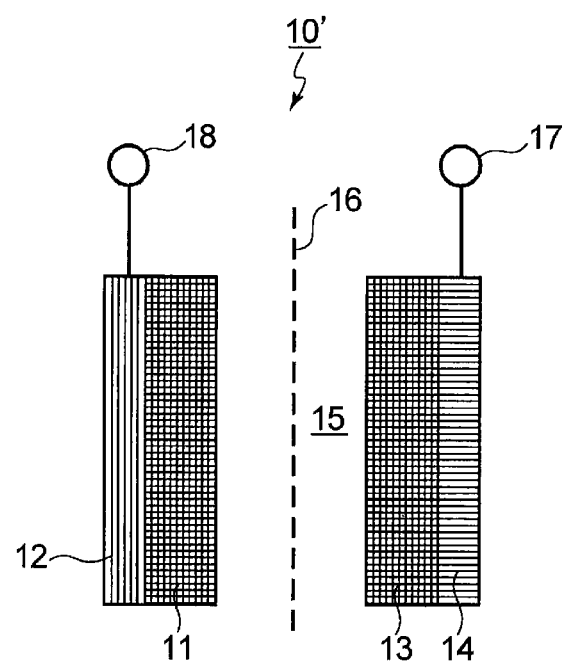
FIG. 2 schematically illustrates the basic structure of a cylindrical nonaqueous secondary battery according to another embodiment of the invention.
Figure 3:
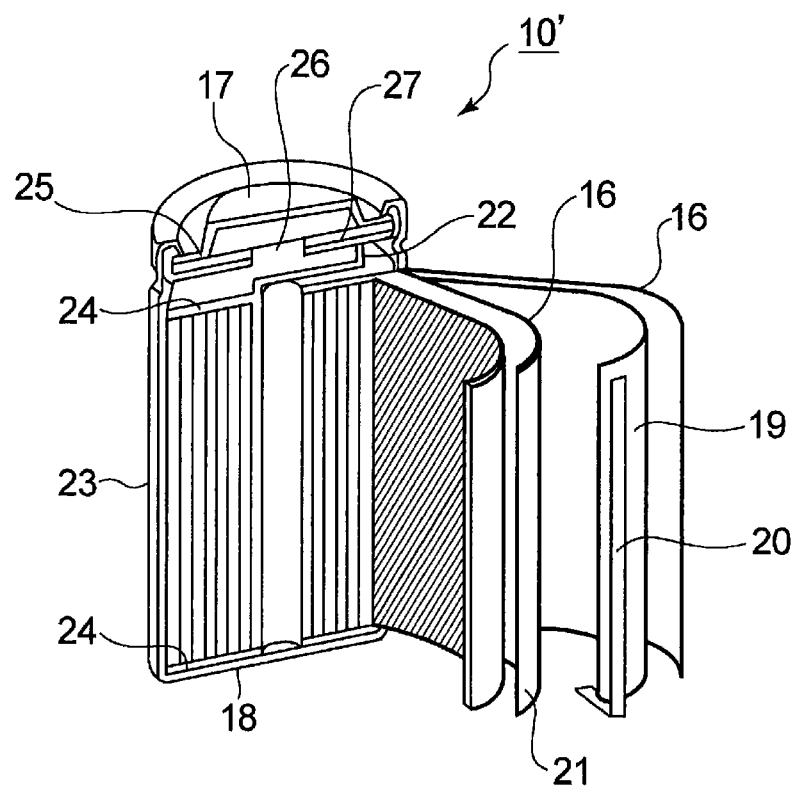
FIG. 3 is a perspective view, with parts exploded and parts in cross-section, illustrating the cylindrical nonaqueous secondary battery of FIG. 2.

As illustrated in FIGS. 2 and 3, the cylindrical battery 10' includes a negative electrode 11, a negative electrode current collector 12, a positive electrode 13, a positive electrode current collector 14, a nonaqueous electrolyte 15 of the invention, a separator 16, a positive electrode terminal 17, a negative electrode terminal 18, a negative electrode plate 19, a negative electrode lead 20, a positive electrode plate 21, a positive electrode lead 22, a case 23, an insulating plate 24, a gasket 25, a safety valve 26, and a PTC element 27.

The novel compound according to the invention will next be described in detail. The novel compound of the invention is represented by general formula (1'), i.e., the compound of formula (1) wherein $R^1$ (corresponding to $R^{1'}$ in formula (1')) is an optionally substituted thiophene ring or an optionally substituted bicyclic, tricyclic, or tetracyclic fused heterocyclic ring containing at least one thiophene ring; and n (corresponding to n' in formula (1')) is an integer of 2 to 6. $R^{1'}$, $R^{2'}$, $R^{3'}$, $R^{4'}$, and $Z^{1'}$ in formula (1') have the same meaning as $R^1$, $R^2$, $R^3$, $R^4$, and $Z^1$, respectively, in formula (1).

The process for preparing the novel compound of the invention is not particularly restricted. For example, the novel compound of the invention may be obtained by starting with a carboxylic acid (2') corresponding to formula (1') and silyl-esterifying the carboxyl group of the acid (2') with a halogenated silane compound or a disilazane compound. The reaction scheme below shows the preparation by the reaction between an n-valent carboxylic acid (2') and n equivalents of a halogenated silane compound (3') in a basic condition.

[Chem. 19]

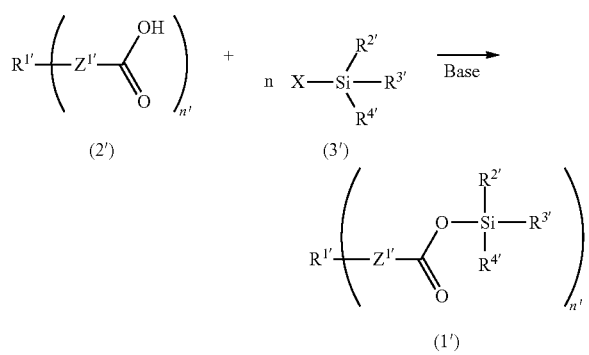

The novel compound of the invention is useful as not only an additive for a nonaqueous electrolyte but also an anti-forming agent, a parting agent, and the like.

EXAMPLES

The invention will now be illustrated in greater detail with reference to Examples, but it should be understood that the invention is not construed as being limited thereto. Unless otherwise noted, all the parts and percents are by mass.

Synthesis Examples 1 to 4 demonstrate synthesis of the compounds of formula (1), of which Synthesis Example 4 shows synthesis of the novel compound of the invention. Examples 1 to 6 and Comparative Examples 1 and 2 show the nonaqueous electrolytes of the invention and the nonaqueous secondary batteries using the same and their comparative examples.

Synthesis Example 1

Synthesis of Compound No. 1-1

In a flask was put 6.397 g (49.9 mmol) of 2-thiophenecarboxylic acid and dried under reduced pressure. After purging with argon, 30.0 ml of butyl acetate was added, and the system was heated to 80° C. To the mixture was slowly added dropwise 6.75 ml (32.5 mmol) of 1,1,1,3,3,3-hexamethyldisilazane, followed by stirring at 100° C. for 3 hours. The reaction mixture was evaporated, and the residual crude product was distilled on an oil bath (bath temperature: 90° C.; vapor temperature: 64° C.; 1.0 mmHg) to give 3.06 g (yield: 31%) of a colorless liquid, which was identified to be the desired compound by $^1$H-NMR and IR analyses. The identification data are shown in Table 1 below.

Synthesis Example 2

Synthesis of Compound No. 2-1

In a flask was put 5.098 g (34.0 mmol) of 2,2'-thiodiglycolic acid and dried under reduced pressure. After purging with argon, 30.0 ml of butyl acetate was added, and the system was heated to 80° C. To the mixture was slowly added dropwise 9.18 ml (44.1 mmol) of 1,1,1,3,3,3-hexamethyldisilazane, followed by stirring at 100° C. for 3 hours. The reaction mixture was evaporated, and the residual crude product was distilled on an oil bath (bath temperature: 150° C.; vapor temperature: 129° C.; 5.4 mmHg) to give 5.759 g (yield: 57.6%) of a colorless liquid, which was identified to be the desired compound by $^1$H-NMR and IR analyses. The identification data are shown in Table 1.

Synthesis Example 3

Synthesis of Compound No. 2-2

In a flask was put 5.929 g (28.2 mmol) of (ethylenedithio)diacetic acid and dried under reduced pressure. After purging with argon, 30.0 ml of butyl acetate was added, and the system was heated to 100° C. To the mixture was slowly added dropwise 7.63 ml (36.7 mmol) of 1,1,1,3,3,3-hexamethyldisilazane, followed by stirring at 100° C. for 3 hours. The reaction mixture was evaporated, and the residual crude product was distilled on an oil bath (bath temperature: 180° C.; vapor temperature: 150° C.; 0.6 mmHg) to give 3.908 g (yield: 39.1%) of a white solid, which was identified to be the desired compound by $^1$H-NMR and IR analyses. The identification data are shown in Table 1.

Synthesis Example 4

Synthesis of Compound No. 2-11

In a flask was put 5.438 g (31.6 mmol) of 2,5-thiophenedicarboxylic acid and dried under reduced pressure. After purging with argon, 50.0 ml of butyl acetate was added, and the system was heated to 100° C. To the mixture was slowly added dropwise 8.54 ml (41.1 mmol) of 1,1,1,3,3,3-hexamethyldisilazane, followed by stirring at 100° C. for 3 hours. The reaction mixture was evaporated, and the residual crude product was distilled on an oil bath (bath temperature: 180° C.; vapor temperature: 150° C.; 0.8 mmHg) to give 4.360 g (yield: 43.6%) of a white solid, which was identified to be the desired compound by $^1$H-NMR and IR analyses. The identification data are shown in Table 1.

TABLE 1

| Compound | | |
|---|---|---|
| 1-1 | $^1$H-NMR | 7.76 (dd, 1H), 7.54 (dd, 1H), 7.08 (dd, 1H), 0.39 (s, 12H) |
| | IR | 1684, 1524, 1416, 1360, 1296, 1272, 1252, 1229, 1095, 1076, 1034, 843, 800, 767, 715, 654 |
| 2-1 | $^1$H-NMR | 3.37 (s, 4H), 0.31 (s, 18H) |
| | IR | 2960, 1709, 1411, 1283, 1252, 1173, 1124, 940, 841, 761, 719 |
| 2-2 | $^1$H-NMR | 3.25 (s, 4H), 2.88 (s, 4H), 0.32 (s, 18H) |
| | IR | 2963, 1684, 1425, 1298, 1249, 1206, 1139, 1121, 941, 913, 841, 763, 720, 705, 667, 620, 569 |
| 2-11 | $^1$H-NMR | 7.68 (s, 2H), 0.41 (s, 18H) |
| | IR | 2960, 1699, 1681, 1528, 1344, 1300, 1251, 1092, 1022, 839, 801, 767, 749, 726, 711, 662 |

$^1$H-NMR: 600 MHz, CDCl$_3$, r.t.
FT-IR: KBr, cm$^{-1}$

Examples 1 to 8 and Comparative Examples 1 to 4

Preparation of Nonaqueous Electrolyte:

An electrolyte solution was prepared by dissolving LiPF$_6$ in a mixed solvent of 30 vol % ethylene carbonate, 40 vol % ethyl methyl carbonate, and 30 vol % dimethyl carbonate in a concentration of 1 mol/l. In the resulting solution was dissolved the compound shown in Table 2 below as an additive in an amount to give the content shown in Table 2 to prepare a nonaqueous electrolyte of the invention or for comparison. The figures in the parentheses in Table 2 indicate the content (mass %) in the nonaqueous electrolyte.
Making and Evaluation of Nonaqueous Secondary Battery:

Nonaqueous secondary batteries (lithium secondary batteries) of Examples and Comparative Examples were made in accordance with the following procedures.
Procedures:
(a) Making of Positive Electrode A Ninety parts of LiMn$_2$O$_4$ as an active material, 5 parts of acetylene black as an electroconductive material, and 5 parts of polyvinylidene fluoride as a binder were mixed, and the mixture was dispersed in 140 parts of N-methyl-2-pyrrolidone to prepare a slurry. The slurry was applied to an aluminum current collector, dried, and pressed to make a positive electrode plate, which was cut to size to provide disk-shaped positive electrode A.
(b) Making of Positive Electrode B Ninety parts of LiNi$_{1/3}$Co$_{1/3}$Mn$_{1/3}$O$_2$ as an active material, 5 parts of acetylene black as an electroconductive material, and 5 parts of polyvinylidene fluoride as a binder were mixed, and the mixture was dispersed in 140 parts of N-methyl-2-pyrrolidone to prepare a slurry. The slurry was applied to an aluminum current collector, dried, and pressed to make a positive electrode plate, which was cut to size to provide disk-shaped positive electrode B.
(c) Making of Negative Electrode Synthetic graphite (97.0 parts) as an active material, 1.5 parts of styrene-butadiene rubber as a binder, and 1.5 parts of carboxymethyl cellulose as a thickener were mixed, and the mixture was dispersed in 120 parts of water. The resulting slurry was applied to a copper current collector, dried, and pressed to make a negative electrode plate, which was cut to size to provide a disk-shaped negative electrode.

(d) Assembly of Battery

The disk-shaped positive and negative electrodes were put into a case with a 25 μm thick polyethylene microporous film interposed therebetween. The nonaqueous electrolyte prepared in (c) above was poured into the case, and the case was closed and sealed to make a 20 mm diameter, 3.2 mm thick coin-shaped lithium secondary battery.

The lithium secondary batteries of Examples and Comparative Examples were tested by the test methods described below. The test results obtained are shown in Table 2.
(1) Test Method for Determining Discharge Capacity Ratio (Initial Characteristics)

Each lithium secondary battery was placed in a thermostat at 20° C. and charged by the CC/CV method at a current of 0.3 mA/cm$^2$, which corresponded to a rate of 0.2 C, to 4.3 V, and then discharged at a constant current of 0.3 mA/cm$^2$, which corresponded to a rate of 0.2 C, to 3.0 V for 5 cycles. Thereafter, the battery was charged by the CC/CV method at 0.3 mA/cm$^2$ to 4.3 V and discharged at 0.3 mA/cm$^2$ to 3.0 V. The discharge capacity in the 6th discharge was taken as an initial discharge capacity of the battery. A ratio of the initial discharge capacity as measured to that of the battery of Comparative Example 1 (in which any electrolyte additive was not used), being taken as 100, was calculated as follows to give a discharge capacity ratio (%) as a measure of initial characteristics.

Discharge capacity ratio (%)=[(initial discharge capacity)/(initial discharge capacity in Comparative Example 1)]×100

(2) Method for Determining Initial Internal Resistance

The lithium secondary battery after the test for determining discharge capacity ratio was charged at a constant current of 1.5 mA/cm$^2$ (corresponding to a rate of 1 C) to an SoC of 60%. The impedance was measured over a frequency range of from 100 kHz to 0.02 Hz using an alternating current impedance measurement system (a mobile potentiostat CompactStat from Ivium Technologies) to prepare a Cole-Cole plot with the imaginary part as ordinate and the real part as abscissa. The arc of the Cole-Cole plot was fitted with a circle. The greater value of the two intersections between the fitting circle and the real part is taken as the initial internal resistance of the battery.

(3) Test Method for Determining Discharge Capacity Ratio (Cycle Characteristics)

The lithium secondary battery after the test for initial characteristics was placed in a thermostat at 60° C. and charged at a constant current of 1.5 mA/cm$^2$, which corresponded to a rate of 1 C (a rate of 1 C means that an entire battery capacity will be discharged in one hour) to 4.3 V and then discharged at a constant current of 1.5 mA/cm$^2$ to 3.0 V for 100 cycles. The discharge capacity in the 100th cycle shall define a discharge capacity after cycles. A ratio of the discharge capacity after cycles to that in Comparative Example 1, being taken as 100, was calculated as follows to give a discharge capacity ratio (%) as a measure of cycle characteristics.

Discharge capacity ratio (%)=[(discharge capacity after cycles)/(discharge capacity after cycles in Comparative Example 1))]×100

(4) Method for Determining Internal Resistance Increase Ratio

The battery after the cycle test was returned to an environment of 20° C., and the internal resistance at 20° C. was determined in the same manner as described above, which was taken as an internal resistance after cycles. An internal resistance increase ratio was calculated from the initial internal resistance and the internal resistance after cycles as follows.

Internal resistance increase ratio (%)=[(internal resistance after cycles−initial internal resistance)/(initial internal resistance)]×100

INDUSTRIAL APPLICABILITY

The invention provides a nonaqueous secondary battery having a nonaqueous electrolyte having a lithium salt dissolved in an organic solvent. The nonaqueous secondary battery of the invention maintains low internal resistance and high electrical capacity even when stored in high temperatures or even after charge/discharge cycles in high temperatures. The invention is effective whether the battery contains, as a positive electrode active material, a salt of a rare earth metal, such as cobalt or nickel, or a manganese-containing, lithium transition metal oxide salt.

REFERENCE SIGNS LIST

1: positive electrode
1a: positive electrode current collector
2: negative electrode
2a: negative electrode current collector
3: electrolyte
4: positive electrode case
5: negative electrode case
6: gasket
7: separator
10: coin-shaped nonaqueous secondary battery
10': cylindrical nonaqueous secondary battery
11: negative electrode
12: negative electrode current collector
13: positive electrode

TABLE 2

| | Positive Electrode | Additive for Electrolyte | Discharge Capacity Ratio (%) | | Initial Resistance Increase Ratio (%) |
| --- | --- | --- | --- | --- | --- |
| | | | Initial Characteristics | Cycle Characteristics | |
| Example 1 | A | compound No. 2-11 (1.0) | 99 | 118 | 22 |
| Example 2 | A | compound No. 2-11 (0.5) | 100 | 115 | 24 |
| Example 3 | A | compound No. 2-11 (0.3) | 100 | 112 | 30 |
| Example 4 | A | compound No. 1-1 (1.0) | 99 | 108 | 23 |
| Example 5 | A | compound No. 1-1 (0.5) | 100 | 111 | 27 |
| Example 6 | A | compound No. 1-1 (0.3) | 100 | 110 | 31 |
| Example 7 | B | compound No. 2-11 (1.0) | 100 | 121 | 23 |
| Example 8 | B | compound NO. 1-1 (1.0) | 99 | 118 | 24 |
| Comp. Example 1 | A | — | 100 | 100 | 95 |
| Comp. Example 2 | A | comp. compound 1* (1.0) | 98 | 103 | 68 |
| Comp. Example 3 | B | — | 101 | 102 | 45 |
| Comp. Example 4 | B | comp. compound 1* (1.0) | 100 | 104 | 48 |

*Comparative compound 1: bistrimethylsilyl isophthalate

Comparative Compound 1 bis(trimethylsilyl) isophthalate

In comparing the nonaqueous secondary batteries of Examples 1 to 8, in which the compound of formula (1) is used, and those of Comparative Examples 1 to 4, in which the compound is not used, it is seen that they are equal in initial charge discharge ratio when used in ambient temperature (25° C.). Nevertheless, the former (Examples 1 to 8) are superior to the latter (Comparative Examples 1 to 4) in discharge capacity ratio after charge/discharge cycles at a high temperature (60° C.). It is also seen that the increase in internal resistance is prevented in batteries of Examples as compared with the batteries of Comparative Examples. The compounds of formula (1) thus prove useful as an additive for a nonaqueous electrolyte.

14: positive electrode current collector
15: electrolyte
16: separator
17: positive electrode terminal
18: negative electrode terminal
19: negative electrode plate
20: negative electrode lead
21: positive electrode
22: positive electrode lead
23: case
24: insulating plate
25: gasket
26: safety valve
27: PTC element

The invention claimed is:

1. A nonaqueous electrolyte comprising an organic solvent and a lithium salt dissolved in the solvent and containing at least one compound represented by general formula (1):

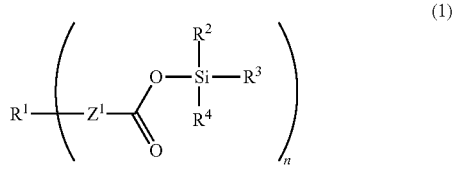

wherein n represents an integer of 1 to 6; with n being 1 or 3 to 6, $R^1$ represents a group having 1 to 20 carbon atoms and at least one of an oxygen atom and a sulfur atom, or with n being 2, $R^1$ represents —O—, —S—, or a group having 1 to 20 carbon atoms and at least one of an oxygen atom and a sulfur atom;

$R^2$, $R^3$, and $R^4$ each independently represent a saturated aliphatic hydrocarbon group having 1 to 20 carbon atoms or an aromatic hydrocarbon group having 6 to 20 carbon atoms;

$Z^1$ represents a direct bond or an optionally substituted divalent aliphatic hydrocarbon group having 1 to 20 carbon atoms; and the group having 1 to 20 carbon atoms and at least one of an oxygen atom and a sulfur atom as represented by $R^1$ is —O—$Z^2$—O—, —S—$Z^3$—S—, an optionally substituted furan ring, an optionally substituted thiophene ring, or an optionally substituted bicyclic, tricyclic, or tetracyclic fused heterocyclic ring containing at least one of a furan ring and a thiophene ring, wherein $Z^2$ represents an optionally substituted divalent aliphatic hydrocarbon group having 1 to 5 carbon atoms, and $Z^3$ represents a direct bond or an optionally substituted divalent aliphatic hydrocarbon group having 1 to 5 carbon atoms.

2. The nonaqueous electrolyte according to claim 1, wherein the compound of general formula (1) is present in an amount of 0.001% to 10% by mass of said nonaqueous electrolyte.

3. A nonaqueous secondary battery containing the nonaqueous electrolyte according to claim 2.

4. A nonaqueous secondary battery comprising a negative electrode capable of intercalating and deintercalating lithium, a positive electrode having a manganese-containing, lithium transition metal complex oxide, and the nonaqueous electrolyte according to claim 2.

5. A nonaqueous secondary battery containing the nonaqueous electrolyte according to claim 1.

6. The nonaqueous secondary battery according to claim 5, wherein the compound of general formula (1) is present in said nonaqueous electrolyte in an amount of 0.001% to 10% by mass of said nonaqueous electrolyte.

7. A nonaqueous secondary battery comprising a negative electrode capable of intercalating and deintercalating lithium, a positive electrode having a manganese-containing, lithium transition metal complex oxide, and the nonaqueous electrolyte according to claim 1.

* * * * *